United States Patent Office 3,031,490
Patented Apr. 24, 1962

3,031,490
PROCESS FOR THE PREPARATION OF
α-AMINO ACIDS
Arthur F. Ferris, Princeton, N.J., and Grannis S. Johnson, Levittown, Pa., assignors to FMC Corporation, a corporation of Delaware
No Drawing. Filed Feb. 28, 1958, Ser. No. 718,129
13 Claims. (Cl. 260—465.4)

This invention relates to an improved process for the production of certain α-amino carboxylic acids and related compounds. In particular, this invention provides a novel process whereby alpha,omega-diamino acids are prepared from cyclic ketones, by means of a simple and improved reaction sequence.

Because of their nutritional importance and commercial value, a great deal of effort has been devoted to attempts to make α-amino carboxylic acids synthetically. The processes heretofore available for the synthesis of certain of the α-amino acids useful as dietary supplements, such as lysine and arginine, have been characterized by a high degree of complexity, and accompanying high cost. For example, the classical synthesis of lysine from cyclohexanone via caprolactam requires seven steps, with very low overall yields. Procedures presently in commercial use are also complicated, multi-step processes, wherein the large number of chemical and operational steps again result in poor overall yields and high cost. None of the current or classical lysine processes approaches in simplicity, economy, or utility that of the instant invention. The same is true for the amino acids arginine and ornithine, which are also available by means of our novel and improved process.

The invention described and claimed herein constitutes an improved method for producing these amino acids, some of which are essential to nutrition, such as lysine and arginine, and some of which are useful in other ways. In addition, certain compounds related to these acids and intermediates therefor, many of which were heretofore difficultly available or not at all, are produced readily by the improved process of this invention.

In copending application Serial No. 697,786, filed November 21, 1957, is described a novel process for the conversion of cyclic ketones to alpha,omega-diamino acids. In one embodiment of that process, the cyclic ketone is oximinated to form an α,α'-dioximino cyclic ketone, which is then cleaved between the carbonyl carbon and one of the alpha-carbons to form an omega-cyano-alpha-oximino carboxylic acid, which is then converted to the corresponding alpha,omega-diamino acid. The cleavage is carried out by reacting the α,α'-dioximino cyclic ketone with an acylating agent in the presence of aqueous alkali. Since there are two oximino groups alpha to the carbonyl group, there is a tendency to dicleavage, which may be minimized by using less than an equimolar amount of acylating agent. However, this reduces the yield of the desired product.

It has now been discovered that an α,α'-dioximino cyclic ketone may be mono-cleaved, while avoiding any dicleavage, to get much improved yields, in many instances approximating quantitative. This is done by first acylating the two oxime groups, and then reacting with a basic cleaving agent in non-aqueous medium. The basic cleaving agent may be a strong base, such as an alkali metal or alkaline earth hydroxide or alkoxide, or a weak base such as an amine, ammonia or pyridine. Basic salts such as the metal carbonates, bicarbonates, phenoxides, acetates, cyanides, enolates, and the like may also be used. In addition to those mentioned, there are many other bases and basic salts which are effective, but which are less readily available, more expensive or otherwise less useful.

The mono-cleavage reaction of this invention occurs even when an excess of the basic cleaving reagent is used, and is in marked contrast with the cleavage of the α,α'-dioximino cyclic ketone described in application Ser. No. 697,786, wherein substantial dicleavage occurs even with a deficiency of cleaving agent.

In this improved process for the synthesis of alpha,-omega-diamino acids from cyclic ketones, the steps of the overall reaction comprise oximinating and acylating the cyclic ketone; cleaving the α,α'-diacyloximino derivative by treating with a base in non-aqueous medium to produce an omega-cyano alpha-oximino or alpha-acyloximino compound, depending on whether or not a hydroxylic solvent is present to remove the acyl group; and reducing and hydrolyzing to an alpha-omega-diamino carboxylic acid. The overall synthesis is illustrated as follows:

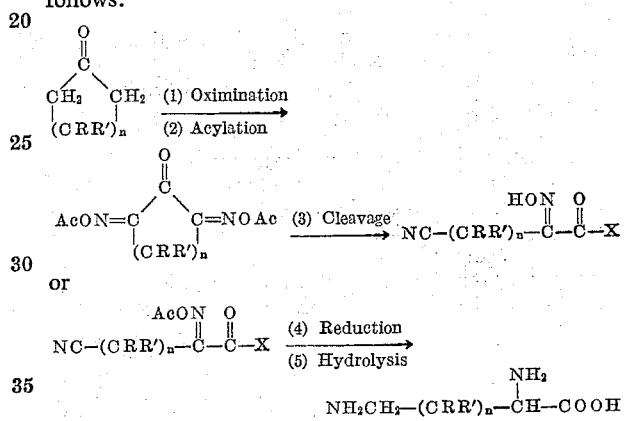

In the above formulae, Ac is an acyl group, and X is the residue derived from the cleavage step. In the grouping represented by $(CRR')_n$, $n$ is preferably an integer from two to four, which would make the starting material a five to seven membered ring, and R and R' may each be hydrogen or any desired substituent.

The specific improvement of the instant invention is in cleavage step 3 above wherein the diacyloximino ketone is mono-cleaved in substantially quantitative yield, to form an omega-cyano alpha-oximino or omega-cyano alpha-acyloximino carboxylic derivative. Whether the alpha-oximino group remains acylated after the cleavage depends on the nature of the solvent for the cleavage step. If the solvent is an alcohol the acyl group may be removed during the reaction, to produce an alpha-oximino derivative. If the solvent is non-hydroxylic the acyl group is retained, to produce an alpha-acyloximino derivative.

It was expected that the product of the cleavage reaction, the omega-cyano alpha-acetoximino or alpha-oximino carboxylic ester, would undergo further cleavage to produce the corresponding dinitrile, since it is known that the corresponding acids undergo such reactions. Had this secondary reaction occurred the yield of the desired mono-cleavage product would again have been reduced. Instead, it was discovered that these omega-cyano alpha-acyloximino or oximino esters are stable to further cleavage. The resistance of these compounds to further attack is truly surprising in view of the readiness with which α-acetoximino acids and also α-acetoximino ketones are cleaved. As a result, the mono-cleavage of α,α'-diacetoximino cyclic ketones may be conducted in substantially quantitative yields, so that difficult separation steps are avoided, and it is no longer necessary to recover and recycle the starting material.

For the alpha,omega-diamino acid lysine, important as a nutritional supplement, the starting material is cyclohexanone. If cyclopentanone is the starting material, one possible product is ornithine, which may be used in known manner to prepare arginine, another important nutritional supplement. If the nitrile group of the 4-cyano-2-oximinobutyrate is hydrolyzed, cyclopentanone can be made to yield glutamine, a chemotherapeutic agent which has shown promise against alcoholism and ulcers, or glutamic acid, widely used, in the form of its monosodium salt, as a flavoring agent. If R and/or R' is a substituent other than hydrogen, for example an alkyl, aryl, halogen, hydroxy, alkoxy, acyloxy, sulfhydryl, mercapto, dialkyl- or diarylamino, acylamino, carboxy or carbalkoxy group, then substituted lysines, ornithines, arginines, glutamines, glutamic acids, and the like can be synthesized. Such compounds are difficultly available, if at all, by previously known methods. They are of considerable interest as chemotherapeutic agents, since they frequently act as amino acid antagonists in living things. Other modifications in the reaction permit the production of a variety of alpha-substituted carboxylic acids and derivatives thereof.

The first step of the process of this invention utilizes a cyclic structure, as illustrated. From practical considerations, these are limited to the 5, 6 and 7-membered ring structures of cyclopentanone, cyclohexanone and cycloheptanone. In these structures the two positions alpha to the keto group should be either unsubstituted or substituted with groups which are readily displaced in the oximination reaction, such as carbalkoxy. The rest of the ring may be substituted with such groups as alkyl, halogen, or other substituents which do not interfere with the desired reaction sequence, either by themselves reacting with nitrite esters or nitrous acid, or by activating the compounds so that nitrosation occurs at other locations than at the alpha-carbon atoms.

The cyclic ketones may be oximinated by known methods. These are discussed in detail in an article entitled "The Nitrosation of Aliphatic Carbon Atoms," by O. Touster, in Organic Reactions, volume VII, John Wiley & Sons, Inc., New York (1948), pp. 327–377. This article describes the various methods of nitrosation, and presents experimental conditions. The most widely used reagent combination is that of an alkyl nitrite and hydrogen chloride; and this combination is effectively and conveniently used in the nitrosation of cyclic ketones to form $\alpha,\alpha'$-dioximino ketones.

Since cyclic ketones react vigorously and exothermically with alkyl nitrites and hydrochloric acid, a low temperature should be maintained during the oximination reaction. The oximination of cyclohexanone, for example, may be carried out over a temperature range of about −30 to +50°. At very low temperatures the reaction proceeds too slowly for convenience, and at temperatures over about 50° C. only tarry side products are obtained. A preferred temperature range is about 0–30° C., maintained by external cooling. An inert atmosphere, although desirable, is not necessary. Neutralizing the acid after completion of the reaction is also advisable, although not necessary. Other cyclic ketones may be oximinated under similar conditions.

The $\alpha,\alpha'$-dioximino cyclic ketone is then acylated to form the $\alpha,\alpha'$-diacyloximino cyclic ketone. A wide variety of acylating agents may be used, the most common of which are the aliphatic and aromatic acid chlorides and anhydrides, although other acylating agents may also be used. The acylation is conducted by standard techniques. Contact with base should be avoided at this stage, to avoid cleavage of the cyclic ketone.

The $\alpha,\alpha'$-diacyloximino cyclic ketone is then cleaved with non-aqueous base. If the cleavage is conducted in a hydroxylic solvent such as alcohol, the product is an omega-cyano alpha-oximino ester. If a non-hydroxylic, inert solvent is used, such as benzene, petroleum solvents, ethers and the like, the product is an omega-cyano alpha-acyloximino compound. Metal alkoxides, which are effective cleaving agents, are conveniently used dissolved in the parent alcohol, or suspended or dissolved in a non-hydroxylic solvent. Effective cleavage is obtained with a metal hydroxide in excess alcohol. The acid amide rather than the ester may be formed by carrying out the cleavage with sodamide. Other effective and readily available cleaving agents are carboxylates and amines, which are conveniently used in alcohol to produce $\alpha$-oximino esters wherein the alcoholic component of the ester is derived from the solvent, or in non-hydroxylic solvents to form $\alpha$-acyloximino anhydrides and amides, respectively. When basic salts are the cleaving agents it is usually more convenient to use these in alcohol, thereby forming an ester of the cleaved product, although the salts may also be used in a non-hydroxylic solvent, to form a variety of derivatives of the alpha-acyloximino omega-cyano acids produced.

The concentration of the cleaving reagent is not critical. It is not necessary that all the cleaving agent be in solution, and a slurry in a saturated solution may be used. In carrying out the reaction, the cleaving agent solution or suspension may be added to the $\alpha,\alpha'$-diacyloximino cyclic ketone, which may be dissolved or partially dissolved in a solvent; or the order of addition may be reversed, and the solid or dissolved diacyloximino cyclic ketone may be added to the cleaving reagent.

The temperature at which the cleavage step is carried out is controlled by the joint considerations of raising the temperature to accelerate the reaction, yet keeping the temperature low enough to avoid alcoholysis of the nitrile group if the reaction is conducted in alcohol. The cleavage reaction tends to be rapid, and the rate depends on how efficiently the exothermic reaction can be controlled. For cleavage with a strong base in alcoholic solvent, optimum yields are obtained in a temperature range of about 0–50° C. At the lower limit the reaction is slow, and at over about 50° C. the nitrile tends to be alcoholyzed in the strongly basic medium. When the cleavage is effected with a weak base, or in an inert solvent such as benzene, dioxane, petroleum ether and the like, the reaction may be conducted at substantially higher temperatures, although this is generally unnecessary due to the rapid exothermic reaction.

It is convenient to use equimolar amounts of cleaving agent and cyclic ketone in the cleavage reaction, although excess cleaving agent does not adversely affect the yield of mono-cleaved product. However, if excess strong base such as alkoxide is used it should be neutralized before proceeding with the next step, to avoid possible alcoholysis of the nitrile group. If less than the theoretical quantity of base is used, unreacted diacyloximino cyclic ketone can of course be recovered and recycled.

After the cleavage reaction is completed, the omega-cyano alpha-oximino or -acyloximino ester is separated from the reaction mixture. In a convenient procedure, the salt formed in the reaction is separated by filtration, the solvent is removed under reduced pressure, and the product is extracted from the residue with a suitable solvent. Other methods of working up the product may of course be used.

The omega-cyano alpha-oximino or alpha-acyloximino derivative is then reduced to the corresponding alpha, omega-diamino compound. Catalytic hydrogenation may be used for the reduction, and a variety of catalyst-solvent systems are effective. Catalytic hydrogenation of the ethyl ester of 5-cyano-2-oximino-valeric acid to form the ethyl ester of lysine, employing an Adams' catalyst (platinum oxide) in acetic anhydride, has been described in the literature by Olynyk et al., J. Org. Chem. 13, 465 (1948). Other suitable precious metal catalysts include unsupported platinum black or palladium black and various forms of supported platinum and palladium, for example on charcoal or alundum. Aliphatic carboxylic acids or anhydrides such as acetic, propionic, and butyric, alone or in admixture with other solvents such as ethers, esters, alcohols and the like are suitable for use with precious metal catalysts. Active forms of metals of group VIII of the periodic table, such as "Raney nickel" and "Raney cobalt," are also useful hydrogenation catalysts, generally with solvents such as aliphatic alcohols, although other solvents may be employed. Chemical reduction may also be used, and the combination of sodium or potassium with an aliphatic alcohol is effective. Electrolytic reduction is also usable. Since in the preferred process both a nitrile and an oximino or acyloximino group are reduced simultaneously, those catalysts and organic or inorganic reducing agents which are employed must be capable of affecting both these groups. The alpha,omega-diamino derivative resulting from the reduction may be hydrolyzed to the free acid by standard techniques.

The invention is illustrated further by the following specific examples, which are not intended to be limitative in terms of the particular reactants or conditions described therein.

EXAMPLE 1

*Preparation of 2,6-Diacetoximinocyclohexanone*

To a stirred solution of 612 g. of acetic anhydride and 1 ml. of concentrated sulfuric acid was added portionwise 156 g. of 2,6-dioximinocyclohexanone, prepared as described in U.S. application Ser. No. 697,786, filed November 21, 1957. The addition required 45 minutes. The temperature rose from 27° to 53° C., and then was held at 50–55° by external cooling. After addition was complete, the temperature was held at 50° for 30 minutes by application of heat. The reaction mixture was cooled to 25°, and the precipitate which formed was recovered by filtration, washed with three 200-ml. portions of benzene, and sucked dry. The lemon yellow crystals of 2,6-diacetoximinocyclohexanone amounted to 183 g. (76% yield), M.P. 177.5–178.5° C.

*Analysis.*—Calcd. for $C_{10}H_{12}O_5N_2$: C, 50.00; H, 5.04; N, 11.66. Found: C, 49.96; H, 5.13; N, 11.64.

EXAMPLE 2

*Cleavage of 2,6-Diacetoximinocyclohexanone With Sodium Ethoxide in Ethanol*

A solution of sodium ethoxide in ethanol was prepared by dissolving 41.4 g. of sodium in 1 liter of absolute ethanol. Four hundred grams of 2,6-diacetoximinocyclohexanone was slurried in 2 liters of absolute ethanol. The sodium ethoxide solution was added slowly to the diacetate slurry, keeping the temperature at 20–30° C. with external cooling. The addition was complete in 1 hour, and the mixture was stirred for an additional hour. The alcohol was then distilled off at reduced pressure, keeping the temperature below 50° C. The residue was taken up in 2 liters of ether, and the ether insoluble portion (sodium acetate) was filtered off. The ether filtrate was shaken with two 1000-ml. portions of saturated sodium bicarbonate solution, then with 17 g. of activated charcoal and filtered. The filtrate was dried with 20 g. of magnesium sulfate, filtered and evaporated to dryness at room temperature, followed by drying under vacuum to obtain 244 g. (79% yield) of ethyl 5-cyano-2-oximinovalerate, M.P. 75–76° C. The melting point reported in the literature for this product is 74° C.

EXAMPLE 3

*Cleavage of 2,6-Diacetoximinocyclohexanone With Sodium Methoxide in Benzene*

A mixture of 800 ml. of dry benzene, 120 g. of 2,6-diacetoximinocyclohexanone and 27 g. of sodium methoxide was stirred. In one hour, the temperature rose from 27° to 65° C. The mixture was cooled, and maintained at 40–50° C. until no further increase in temperature occurred. The mixture was then cooled to room temperature, and filtered, from the insoluble sodium acetate. The benzene was distilled off at reduced pressure, keeping the temperature below 50° C., and the residue was further freed of volatile impurities by keeping it under vacuum at room temperature. The final residue amounted to 66 g. (62% yield) of a brown oil which crystallized partially on standing. Recrystallization from 50–50 ethyl acetate-cyclohexane produced white crystals, M.P. 48° C. The infrared spectra of the crystals and the oil were essentially identical, and were consistent with the predicted spectrum for methyl 2-acetoximino-5-cyanovalerate.

*Aanalysis.*—Calcd. for $C_9H_{12}O_4$: C, 50.94; H, 5.70; N, 13.20. Found: C, 50.80; H, 5.73; N, 13.50.

EXAMPLE 4

*Cleavage of 2,6-Diacetoximinocyclohexanone With Sodium Hydroxide in Ethanol*

To a stirred solution of 24.0 g. of 2,6-diacetoximinocyclohexanone in 300 ml. of absolute ethanol was added a solution of 4.0 g. of sodium hydroxide in 300 ml. of absolute ethanol. The temperature was held at 20–30° C. by external cooling. After addition was complete the mixture was stirred for 30 minutes, than the ethanol was removed by distillation at reduced pressure. Pot temperature was not allowed to exceed 50° C. The residue was taken up in 100 ml. of ether, and the resulting slurry was filtered to remove sodium acetate. Evaporation of the filtrate gave 15.5 g. (84% yield) of crude product, which o nrecrystallization from carbon tetrachloride produced pure ethyl 5-cyano-2-oximinovalerate, M.P. 74–75° C.

EXAMPLE 5

*Cleavage of 2,6-Diacetoximinocyclohexanone With Sodium Acetate in Ethanol*

To a slurry of 10.0 g. of 2,6-diacetoximinocyclohexanone in 30 ml. of absolute ethanol was added 5.0 g. of anhydrous sodium acetate all at once with vigorous stirring. The temperature of the mixture rose rapidly to 80° C., then declined slowly. After about an hour's standing, the ethanol was aveporated under reduced pressure at 60° C. To the resulting semi-solid mass was added 100 ml. of ether, and, after thorough mixing, the undissolved solids were removed by filtration. The resulting ether solution was washed with aqueous sodium bicarbonate, dried, and evaporated under reduced pressure. There remained 7.8 g. of white solid, M.P. 50–56°. Comparison of the infrared spectrum of this product with authentic spectra indicated that the material was about half ethyl 5-cyano-2-oximinovalerate and half ethyl 5-cyano-2-acetoximinovalerate. The combined yield of the two products was 92% of the theoretical amount.

EXAMPLE 6

*Cleavage of 2,6-Diacetoximinocyclohexanone With n-Butylamine in Ethanol*

To 200 ml. of absolute ethanol, 24.0 g. of 2,6-diacetoximinocyclohexanone were added. To this slurry, 14.6 g. of n-butylamine were added dropwise, with cooling. On the addition of the first portion of base the temperature rose rapidly to 55° C. Very little heat effect was noted on addition of the remainder of the amine. After the addition was complete, the volatile materials were stripped off and the residue was taken up in 500 ml. of ether. The ether solution was washed with dilute hydrochloric acid and saturated sodium bicarbonate, and decolorized with activated charcoal. The mixture was filtered through anhydrous magnesium sulfate, and the filtrate was stripped to dryness. The residue amounted to 14.5 g. of white solid, M.P. 70°. The infrared spectrum was identical to that of ethyl 5-cyano-2-oximinovalerate. The yield was 81%.

EXAMPLE 7

*Cleavage of 2,6-Diacetoximinocyclohexanone With Diethylamine in Ethanol*

Twenty-four grams of 2,6-diacetoximinocyclohexanone was added to 300 ml. of absolute ethanol. While stirring, 24 g. of diethylamine was added to this slurry at 20–30° C. A clear brown solution was obtained. It was stripped of volatile materials on a hot water bath, and the residue was taken up in 300 ml. of ether. The ether solution was washed with saturated sodium bicarbonate and decolorized with activated charcoal. This mixture was then filtered through anhydrous magnesium sulfate, and the filtrate was stripped to dryness. A residue of 14 g. of white solid, M.P. 73°, was obtained. When a sample of this was mixed with authentic ethyl 5-cyano-2-oximinovalerate, no depression in melting point was noted. Also, the infrared spectrum of this product was identical to that of ethyl 5-cyano-2-oximinovalerate. The yield was 78% of theory.

EXAMPLE 8

*Cleavage of 2,6-Diacetoximinocyclohexanone With Sodium Amide*

To 500 ml. of liquid ammonia was added 24 g. of 2,6-diacetoximinocyclohexanone. In a separate flask was placed 250 ml. of liquid ammonia and about 0.1 g. of nickel nitrate, and to this was added 2.3 g. of sodium in small pieces. This mixture was stirred until its color changed from blue to gray. Then, while still being stirred it was added dropwise to the solution of 2,6-diacetoximinocyclohexanone in liquid ammonia. After the addition was complete, stirring of the reaction mixture was continued for 30 minutes. The ammonia was evaporated. The products were acetamide and 5-cyano-2-oximinovaleramide, M.P. 110° C. The infrared spectrum of this product was consistent with what would be expected of 5-cyano-2-oximinovaleramide.

*Analysis.*—Calcd. for $C_9H_{12}N_2O_4$: C, 46.43; N, 27.07; H, 5.84. Found: C, 47.36; N, 26.59; H, 6.12.

EXAMPLE 9

*Preparation of 2,6-Dibenzoyloximinocyclohexanone*

To a stirred solution of 56 g. of benzoyl chloride and 24 g. of pyridine in 200 ml. of benzene was added 15.6 g. of 2,6-dioximinocyclohexanone. The temperature rose from 26° to 41° C. The mixture was held at 45–50° C. for 30 minutes, then was cooled to 20° and the precipitated solid recovered by filtration. The filter cake was washed with benzene and then alcohol, and was dried. There was obtained 17 g. (48% yield) of solid 2,6-dibenzoyloximinocyclohexanone, M.P. 186–187° C.

*Analysis.*—Calcd. for $C_{20}H_{16}O_5N_2$: C, 65.93; H, 4.43; N, 7.69. Found: C, 65.92; H, 4.70; N, 7.65.

EXAMPLE 10

*Cleavage of 2,6-Dibenzoyloximinocyclohexanone With Sodium Ethoxide in Ethanol*

A solution of 0.6 g. of sodium in 100 ml. of absolute ethanol was prepared, and added to a slurry of 8.5 g. of 2,6-dibenzoyloximinocyclohexanone in 150 ml. of absolute ethanol, with cooling to maintain a temperature of 20–30° C. The time of addition was 15 minutes, and stirring was continued for 30 minutes more. The excess alcohol was then distilled off at reduced pressure and at a temperature not exceeding 50° C. The residue was taken up in 50 ml. of hot carbon tetrachloride, and filtered from the insoluble sodium benzoate. The filtrate was cooled to obtain 2.8 g. (60% yield) of crystalline ethyl 5-cyano-2-oximinovalerate, M.P. 72–72° C. The infrared spectrum of this material was identical with that of an authentic sample of ethyl 5-cyano-2-oximinovalerate.

EXAMPLE 11

*Preparation of DL-Lysine From Methyl 5-Cyano-2-Acetoximinovalerate*

A mixture of 11 g. of methyl 5-cyano-2-acetoximinovalerate, 60 ml. acetic anhydride and 0.6 g. platinum oxide were agitated in a Parr apparatus at room temperature and an initial pressure of 50 p.s.i. After 24 hours the theoretical amount of hydrogen was taken up, and the pressure had dropped to 33.5 p.s.i. The catalyst was removed by filtration, and the filtrate mixed with 150 ml. of concentrated hydrochloric acid and 30 ml. water and refluxed for 11 hours. The water and hydrochloric acid were evaporated at reduced pressure at 50–60° C. The resulting semi-solid mass was treated with 50 ml. of concentrated hydrochloric acid, again evaporating to a semi-solid. This residue was treated with 150 ml. of absolute ethanol, and filtered. To the filtrate was added 600 ml. of ether. A white precipitate of DL-lysine dihydrochloride formed. This solid was dissolved in 150 ml. of hot 97.5% ethanol, and 11 ml. of pyridine in 25 ml. of hot absolute ethanol was added. A white solid precipitated, and after standing for 12 hours at 5° C. the solid was recovered by filtration and dried. The product amounted to 2.0 g. (21% yield) of pure DL-lysine monohydrochloride, M.P. 261–2° C. The infrared spectrum was identical with that of an authentic sample of DL-lysine monohydrochloride.

EXAMPLE 12

*Preparation of 2,5-Diacetoximinocyclopentanone*

To a stirred mixture of 102.0 g. of acetic anhydride and 0.4 ml. of sulfuric acid, 28.0 g. of 2,5-dioximinocyclopentanone was added in small portions over about 15 minutes. The temperature rose spontaneously to 39° C. The mixture was warmed to 50° C. to insure complete reaction, then cooled to 10° C. and filtered. The filter cake was washed with benzene and dried. A 30% yield of 2,5-diacetoximinocyclopentanone was obtained, which on recrystallization from acetone produced bright lemon-yellow crystals, M.P. 177° C.

*Analysis.*—Calcd. for $C_9H_{10}O_5N_2$: C, 47.79; H, 4.46; N, 12.39. Found: C, 48.02; H, 4.42; N, 12.38.

EXAMPLE 13

*Cleavage of 2,5-Diacetoximinocyclopentanone With Sodium Ethoxide in Ethanol*

A solution of sodium ethoxide in ethanol was prepared by dissolving 23.0 g. of sodium in 1000 ml. of absolute ethanol. This solution was added at 20–30° C. to a slurry of 226.0 g. of 2,5-diacetoximinocyclopentanone in 1000 ml. of absolute ethanol. After addition was complete the volatile materials were distilled off at reduced pressure. The residue was taken up in 2000 ml. of ether, and the insoluble sodium acetate was filtered off. The filtrate was stirred with 20 g. of activated charcoal for one hour, filtered, and the filtrate dried over magnesium sulfate. This mixture was filtered, the filtrate was distilled to remove the ether, and the residue was kept under vacuum for some time to remove volatile impurities. There remained 140.0 g. (82% yield) of ethyl 4-cyano-2-oximinobutyrate, a light brown oil, $N_D^{25}$ 1.4750.

*Analysis.*—Calcd. for $C_7H_{10}O_3N_2$: C, 49.40; H, 5.92; N, 16.46. Found: C, 49.31; H, 6.14; N, 16.29.

EXAMPLE 14

*Preparation of DL-Ornithine From Ethyl 4-Cyano-2-Oximinobutyrate*

A 13.0 g. portion of ethyl 4-cyano-2-oximinobutyrate was added to 80 ml. of acetic anhydride, and to this 0.30 g. of platinum oxide was added. This mixture was shaken under hydrogen in a Parr apparatus at an initial pressure of 50 p.s.i. until the calculated amount of hydrogen was absorbed. The catalyst was filtered off, and the filtrate was treated with 40 ml. of water and 120 ml. of concentrated hydrochloric acid, and refluxed overnight. The solution then was evaporated to dryness and treated with two successive 25 ml. portions of concentrated hydrochloric acid, the excess acid being evaporated after each addition. The residue was dissolved in 200 ml. of absolute alcohol, which solution was treated with 800 ml. of ether to precipitate the dihydrochloride of the product. The ether was decanted and the residue was taken up in 200 ml. of absolute ethanol and warmed. To the resulting solution, a solution of 10 ml. of pyridine in 40 ml. of ethanol was added with stirring. The mixture was cooled, to precipitate 1.6 g. (16% yield) of DL-ornithine monohydrochloride, M.P. 207° C. The infrared spectrum of this material was identical with that of an authentic sample of DL-ornithine monohydrochloride.

EXAMPLE 15

*Preparation of 2,6-Diacetoximino-4-Methylcyclohexanone*

To 51.0 g. of acetic anhydride containing 0.5 ml. of sulfuric acid, 17.0 g. of 2,6-dioximino-4-methylcyclohexanone, were added in small portions. The temperature rose to 50° C. After reaction was complete, the mixture was allowed to cool to room temperature. It was then cooled further to 10° C. and filtered. The filter cake was washed with cold acetic anhydride and then with ether. The dried product weighed 13.5 g. (53% yield) M.P. 171-172° C.

*Analysis.*—Calcd. for $C_{11}H_{14}O_5N_2$: C, 51.96; H, 5.55; N, 11.02. Found: C, 51.80; H, 5.64; N, 11.32.

EXAMPLE 16

*Cleavage of 2,6-Diacetoximino-4-Methylcyclohexanone With Sodium Ethoxide in Ethanol*

A solution of sodium ethoxide in ethanol was prepared by dissolving 11.5 g. of sodium in 500 ml. of absolute ethanol. This solution was added dropwise at 20–30° C. to a suspension of 122.0 g. of 2,6-diacetoximino-4-methylcyclohexanone in 500 ml. of absolute ethanol. On completion of the addition, the resulting solution was evaporated under reduced pressure to a solid mass. The residue was taken up in 1000 ml. of ether, and the insoluble sodium acetate was filtered off. The filtrate was stirred with 20 g. of decolorizing charcoal. After filtering off the charcoal, the solution was allowed to evaporate to dryness, then dried further in a vacuum dessicator. The final weight of crude product was 85.0 g. (86% yield). Recrystallization from carbon tetrachloride produced pure ethyl 5-cyano-4-methyl-2-oximinovalerate, M.P. 61° C.

*Analysis.*—Calcd. for $C_9H_{14}O_3N_2$: C, 54.53; H, 7.12; N, 14.14. Found: C, 54.71; H, 6.87; N, 14.25.

EXAMPLE 17

*Preparation of DL-2,6-Diamino-4-Methylcaproic Acid*

To 10 g. of ethyl 5-cyano-4-methyl-2-oximinovalerate in 80 ml. of acetic anhydride was added 0.60 g. of platinum oxide. The mixture was shaken in a Parr hydrogenation apparatus under hydrogen at an initial pressure of 50 p.s.i. After shaking overnight, the calculated amount of hydrogen had been consumed. The mixture was filtered to remove the catalyst. The filtrate was treated with 40 ml. of water, followed by cautious addition of 120 ml. of concentrated hydrochloric acid. This mixture was refluxed six hours, then evaporated to dryness and treated with two 25 ml. portions of concentrated hydrochloric acid, evaporating the mixture to dryness after each addition. The final residue was taken up in 100 ml. of 95% ethanol, and on dilution with 400 ml. of ether the dihydrochloride of the product precipitated as a syrup. The ether was decanted, and the residue was taken up in 200 ml. of ethanol and warmed, followed by the addition of a warm solution of 10 ml. of pyridine in 50 ml. of ethanol. A precipitate formed of 1.8 g. (18% yield) of 2,6-diamino-4-methylcaproic acid monohydrochloride, M.P. 229-230° C.

*Analysis.*—Calcd. for $C_7H_{17}O_2N_2Cl$: C, 42.74; H, 8.71; N, 14.24; Cl, 18.03. Found: C, 42.71; H, 8.71; N, 14.46; Cl, 18.10.

From the foregoing description and illustrative examples it is apparent that the novel process of this invention is susceptible to numerous modifications and variations within the scope of the disclosure, and it is intended to include such modifications and variations within the scope of the following claims.

We claim:

1. The method of producing an omega-cyano alpha-oximino carboxylic derivative selected from the group consisting of esters, amides and anhydrides of omega-cyano alpha-oximino and omega-cyano alpha-acyloximino carboxylic acids, which comprises reacting an alpha,alpha'-diacyloximino cyclic ketone having a five to seven carbon ring with base in non-aqueous medium, wherein the acyl group is that of a carboxylic acid, whereby the ring structure of the cyclic ketone is cleaved between the carbonyl carbon and one of the alpha carbons, to form said omega-cyano alpha-oximino carboxylic derivative.

2. The method of producing an omega-cyano alpha-oximino carboxylic ester which comprises reacting an alpha,alpha'-diacyloximino cyclic ketone having a five to seven carbon ring with a metal alkoxide in non-aqueous medium, wherein the acyl group is that of a carboxylic acid, whereby the ring structure of the cyclic ketone is cleaved between the carbonyl carbon and one of the alpha carbons, to form said omega-cyano alpha-oximino carboxylic ester.

3. The method of producing an omega-cyano alpha-oximino carboxylic ester which comprises reacting an alpha,alpha'-diacyloximino cyclic ketone having a five to seven carbon ring with a metal hydroxide in alcohol, wherein the acyl group is that of a carboxylic acid, whereby the ring structure of the cyclic ketone is cleaved between the carbonyl carbon and one of the alpha carbons, to form said omega-cyano alpha-oximino carboxylic ester.

4. The method of producing an omega-cyano alpha-oximino carboxylic ester which comprises reacting an alpha,alpha'-diacyloximino cyclic ketone having a five to seven carbon ring with a basic salt in alcohol, wherein the acyl group is that of a carboxylic acid, whereby the ring structure of the cyclic ketone is cleaved between the carbonyl carbon and one of the alpha carbons, to form said omega-cyano alpha oximino carboxylic ester.

5. The method of producing an omega-cyano alpha-oximino carboxylic ester which comprises reacting an alpha,alpha'-diacyloximino cyclic ketone having a five to seven carbon ring with a lower aliphatic amine in alcohol, wherein the acyl group is that of a carboxylic acid, whereby the ring structure of the cyclic ketone is cleaved between the carbonyl carbon and one of the alpha carbons, to form said omega-cyano alpha-oximino carboxylic ester.

6. The method of producing a lower alkyl omega-cyano alpha-oximino carboxylate which comprises reacting an alpha,alpha'-dicycloximino cyclic ketone having a five to seven carbon ring with an alkali metal lower alkoxide in the corresponding lower alkanol, wherein the acyl group is that of a carboxylic acid, whereby the ring structure of the cyclic ketone is cleaved between the carbonyl carbon and one of the alpha carbons, to form said lower alkyl omega-cyano alpha-oximino carboxylate.

7. The method of producing 2,6-diaminocaproic acid from 2,6-dioximinocyclohexanone, which comprises diacylating 2,6-dioximinocyclohexanone, wherein the acyl group is that of a carboxylic acid, cleaving the 2,6-diacyloximinocyclohexanone with base in non-aqueous medium to form a 2-oximino-5-cyanovaleric acid derivative, and reducing and hydrolyzing the 2-oximino-5-cyanovaleric acid derivative to produce 2,6-diaminocaproic acid.

8. The method of producing 2,5-diaminovaleric acid from 2,5-dioximinocyclopentanone which comprises diacylating 2,5-dioximinocyclopentanone, wherein the acyl group is that of a carboxylic acid, cleaving the 2,5-diacyloximinocyclopentanone with base in non-aqueous medium to form a 2-oximino-4-cyanobutyric acid derivative, and reducing and hydrolyzing the 2-oximino-4-cyanobutyric acid derivative to produce 2,5-diaminovaleric acid.

9. 2,6-diacetoximinocyclohexanone.
10. 2,5-diacetoximinocyclopentanone.
11. Methyl 5-cyano-2-acetoximinovalerate.
12. Ethyl 4-cyano-2-acetoximinobutyrate.
13. 5-cyano-2-oximinovaleramide.

References Cited in the file of this patent

Degering: "An Outline of Organic Nitrogen Compounds" (1950), pages 181 and 182.